United States Patent [19]
Voegeli

[11] Patent Number: 4,663,676
[45] Date of Patent: May 5, 1987

[54] RETURN TO ZERO VERTICAL MAGNETIC RECORDING SYSTEM

[75] Inventor: Otto Voegeli, Morgan Hill, Calif.

[73] Assignee: International Business Machines, Armonk, N.Y.

[21] Appl. No.: 775,850

[22] Filed: Sep. 13, 1985

[51] Int. Cl.[4] ............................................. G11B 5/09
[52] U.S. Cl. ...................................... 360/40; 360/39; 360/46
[58] Field of Search .................... 360/40, 134, 39, 46

[56] References Cited

U.S. PATENT DOCUMENTS

| | | | |
|---|---|---|---|
| 4,251,842 | 2/1981 | Iwasaki et al. | 360/134 |
| 4,286,299 | 8/1981 | Shirakata et al. | |
| 4,390,907 | 6/1983 | Fujiwara | 360/40 |
| 4,442,159 | 4/1984 | Dezawa et al. | 360/134 |

FOREIGN PATENT DOCUMENTS 3120549 3/1982 Fed. Rep. of Germany .
56-163517 12/1981 Japan .

OTHER PUBLICATIONS

IBM Tech. Discl. Bull. vol. 24, No. 8, Jan. 1982, p. 4034, entitled "Vertical Record/Read Magnetic Head" by T. A. Schwarz.

Primary Examiner—Vincent P. Canney
Attorney, Agent, or Firm—Otto Schmid, Jr.

[57] ABSTRACT

A return-to-zero (RZ) vertical digital magnetic recording method and apparatus comprising a selectively magnetizable recording medium which includes a recording layer of magnetic material having a low vertical remanence. A magnetic recording head is positioned in close proximity to the recording medium, and relative motion is produced between the recording medium and the recording head. To record data, the recording head is energized with one short duration current pulse for each unit of data to be recorded. The resulting bipolar magnetic write field closes substantially perpendicular through the recording medium thereby producing, in the medium, a similarly bipolar flux configuration having the magnetic transition centered about the gap of the magnetic recording head. Data is represented by these transitions in RZ vertical magnetic recording.

15 Claims, 12 Drawing Figures

RETURN TO ZERO VERTICAL MAGNETIC RECORDING SYSTEM

BACKGROUND OF THE INVENTION

1. Field Of The Invention

The invention relates to magnetic recording and more particularly to a vertical recording method and apparatus.

2. Description Of The Prior Art

Present efforts in vertical digital magnetic recording are based on the non-return-to-zero (NRZ) recording method. In this mode, the magnetic medium is saturated between magnetic transitions with the unidirectional write field from the trailing edge of the recording head. When this field is reversed, a transition is written. The NRZ mode is ideally suited and hence is in general use for horizontal digital recording. However, the NRZ mode of recording is not as suitable for vertical digital magnetic recording since this mode cannot fully utilize the performance potential of the vertical recording system either in terms of output signal or with respect to recording density.

SUMMARY OF THE INVENTION

It is therefore the principle object of the invention to provide a vertical recording method and apparatus which is operable in a return-to-zero (RZ) mode.

In accordance with the invention, a vertical recording method and apparatus comprises a selectively magnetizable recording medium having a recording layer of magnetic material having low vertical remanence preferably on a high permeability underlayer, a magnetic recording head having a recording gap in close proximity to the recording medium, means to produce relative motion between the recording medium and the recording head, and means for supplying signals representing information to the recording head. The signals comprise one unidirectional current pulse for each unit of information to be recorded. The resulting bipolar magnetic write field closes substantially perpendicular through the surface of the recording medium so that the magnetic flux passes transversely through the recording layer of the recording medium whereby a bipolar magnetic recording is produced in an RZ vertical recording mode centered about the gap of the magnetic recording head.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 is a diagram showing the write field configuration produced in response to the current drive pulse of FIG. 3a.

DESCRIPTION OF THE PREFERRED EMBODIMENTS

Figure 1:
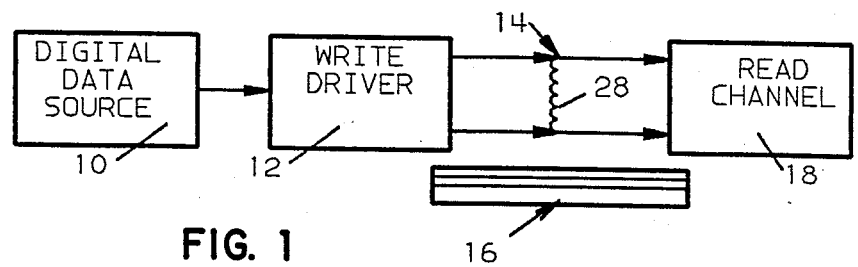
FIG. 1 is a schematic block diagram of the apparatus used to practice the method comprising the present invention.

With reference to FIG. 1 depicting a preferred embodiment of the apparatus for carrying out the invention, a digital data source 10 supplies digital data signals suitable for "return to zero" (RZ) vertical recording to write driver 12. The write driver 12 generates a pulse of write current representing the data signals, and this write current is coupled to energize magnetic read/write head 14 to produce RZ vertically recorded transitions in a magnetic recording medium 16 suitable for RZ vertical recording. Magnetic read/write head 14 is also used to read previously RZ vertically recorded data from magnetic recording medium 16, and the read data signals are coupled to read channel 18 in which the read data signals are amplified and processed to identify the RZ vertically recorded digital data which was previously recorded.

Figure 2:
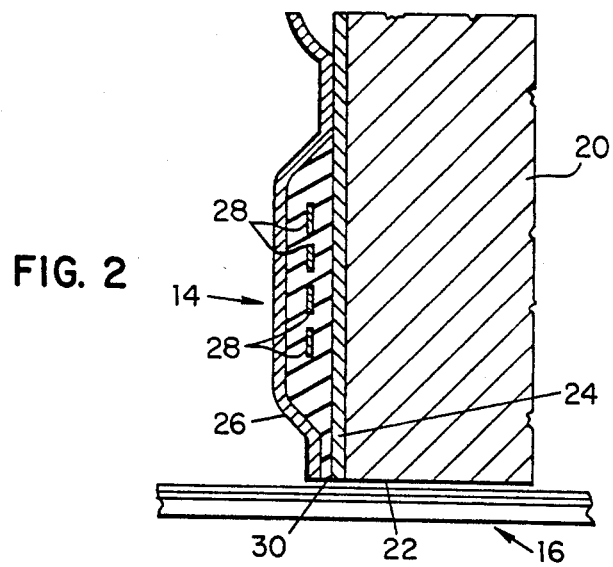
FIG. 2 is a section view of a specific embodiment of the magnetic read/write head of FIG. 1.

Any magnetic read/write head and magnetic recording medium suitable for RZ vertical recording can be used. A specific embodiment of the RZ vertical recording magnetic read/write head 14 and the RZ vertical magnetic recording medium 16 is shown in FIG. 2. The magnetic head 14 shown in FIG. 2 is a thin film magnetic head which is formed on a nonmagnetic ceramic substrate 20, as is known in the art. After deposition of the thin film structure, the substrate is formed to provide an air bearing surface 22, which may be cylindrical, tapered, taper-flat, or of some other geometry. The thin film structure includes magnetic pole pieces 24 and 26 and a winding 28 having at least one turn. Pole pieces 24 and 26 are separated by a small distance at air bearing surface 22 to produce a transducing gap 30. When winding 28 is energized with a suitable write current pulse, a recording magnetic field is produced at transducing gap 30.

The embodiment of the RZ vertical magnetic recording medium 16 shown in FIG. 4 comprises a nonmagnetic substrate 32 and a soft magnetic underlayer 34 deposited on the substrate 32 below the magnetic recording layer 36. The RZ vertical recording medium 16 according to the invention preferably has a smaller coercivity and hence vertical remanence than is typically used in conventional vertical recording Typical ranges are given in Table 1 for the saturation magnetization, $4\pi M_s$, vertical remanence, $M_r/M_s$ and vertical coercivity $H_c$ for vertical recording media for reported usage in the NRZ mode and the workable parameters for the RZ vertical recording of the present invention.

TABLE I

| Typical Medium Characteristics Vertical Recording Media | | | |
|---|---|---|---|
| | NRZ | RZ | |
| $4\pi M_s$ | 2000–6000 | 4000–10000 | Gauss |
| $M_r/M_s$ | 30–80 | 2–20 | % |
| $H_c$ | 600–1200 | 200–800 | Oe |

Figure 3:
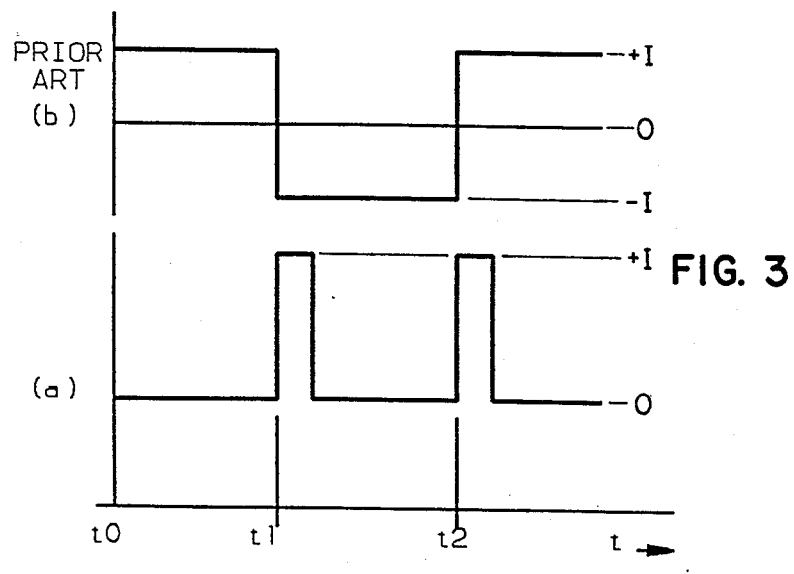
FIG. 3a is a plot of current supplied to the magnetic read/write head versus time for the present invention in the RZ mode and FIG. 3b is a similar plot for a magnetic read/write head operated in the prior art NRZ mode.
Figure 4:
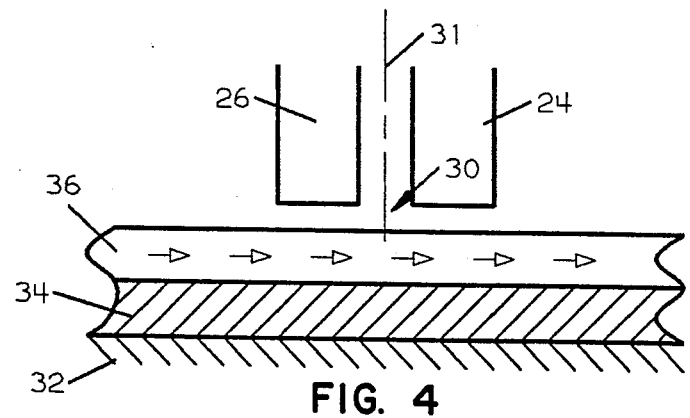
FIG. 4 is a diagram showing the preferred embodiment of the vertical recording medium according to the present invention.
Figure 5:
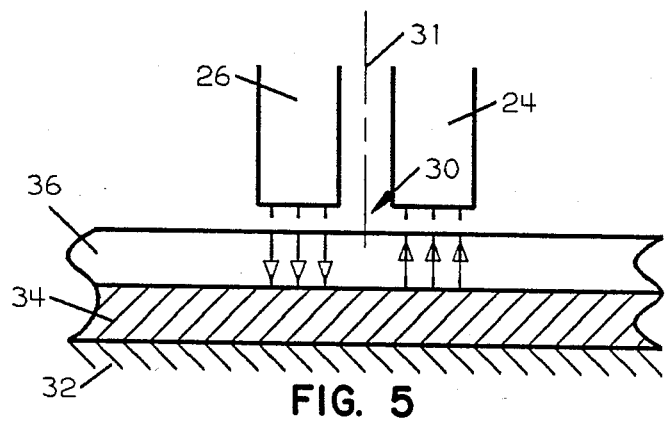
Figure 6:
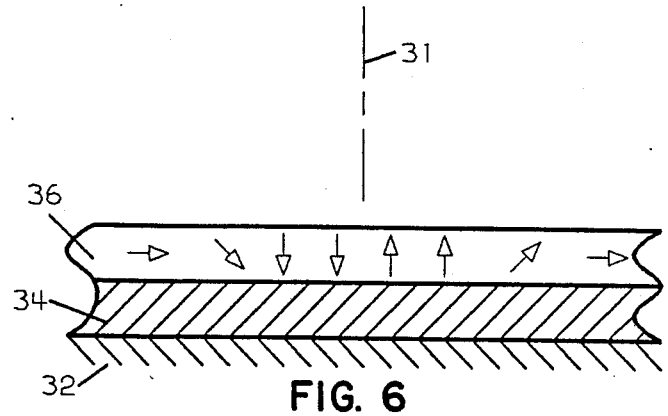
FIG. 6 is a diagram showing the recorded RZ transition produced in the vertical recording medium as a result of the write field configuration of FIG. 5.

The preferred embodiment of the RZ vertical recording medium is shown in FIG. 4. The medium comprises a nonmagnetic substrate 32, a high permeability underlayer 34 and the low coercivity RZ recording layer 36. The medium is DC erased prior to recording to produce the magnetization configuration shown by the arrows in the drawing (FIG. 4). When the RZ vertical recording magnetic read/write head 14 is energized with a unidirectional current pulse (see FIG. 3a) a write field configuration is produced as shown in FIG. 5. This bipolar write field closes substantially perpendicular to the surface of the recording medium and is centered about the transducing gap 30 of the recording head 14 as shown by the centerline of symmetry 31. The resulting recorded transition is also centered about the gap 30 as shown in FIG. 6.

The recording method according to the invention utilizes vertical recording in a RZ mode. To produce recording in the RZ vertical recording mode it is necessary to use a short pulse of write current instead of polarity reversals, as used in the prior art "non return to zero" NRZ recording mode. This is illustrated in FIG. 3b in which the NRZ write current is ON at some selected level I all the time, and to write a transition, the polarity of the write current is reversed. As shown in FIG. 3b at time t=t0 the write current is at +I, and at time t=t1, the polarity of the write current is switched to −I to write a first transition. At t=t2, the polarity of the write current is again switched to +I to write a second transition.

In contrast to this operation, FIG. 3a shows write current for the RZ vertical recording mode at zero at time t=t0, and the write current remains at zero until time t=t1. At this time a short pulse of write current with pulse length T and amplitude I is produced to record a first transition. The write current then returns to zero until a second short pulse of write current, with pulse length T, is produced at time t=t2 to produce a second transition. The write current for the RZ vertical recording mode is a short pulse of current, and the write process takes place symmetrically about the gap region of the head. The associated write field has bipolar symmetry and has a spatial extent directly governed by the pole piece geometry. In this context, bipolar describes a magnetic field or magnetic flux centered about the transducing gap having on one side an excursion in the upward direction and on the other side a substantially equal excursion in the downward direction with respect to the plane of the recording medium. The data bits recorded in the recording medium 16 in response to the short pulses of current have a symmetric bipolar magnetization configuration, and have their size limited by internal demagnetizing fields.

The RZ vertical recording system embodying the invention has the advantages of not only lower write current but also of increased linear storage density. The resulting output signal is improved in both amplitude and wave form. In addition, since the vertical magnetization vanishes between data bits in the RZ vertical recording method according to the invention, a variety of options are available for data encoding.

Figure 7:
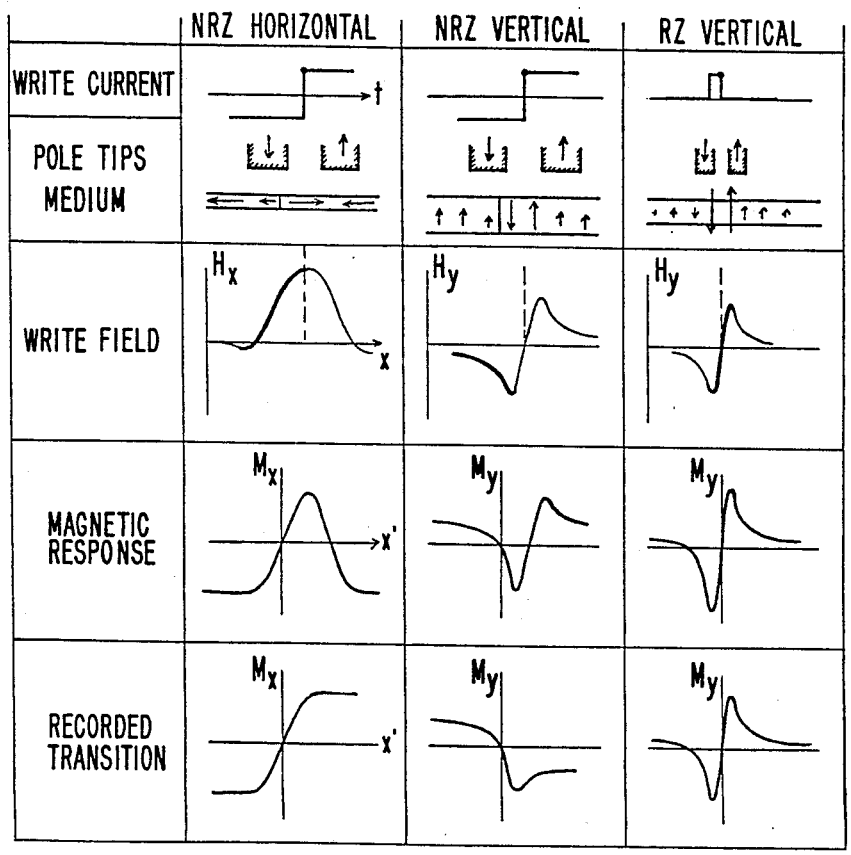
FIG. 7 is a table showing a comparison of write current, write field, magnetic response and recorded transition for recording in the NRZ mode for both horizontal and vertical recording, and in the RZ vertical mode.

To contrast the operation according to the RZ vertical recording according to the present invention, FIG. 7 provides a comparative overview of NRZ and RZ recording principles when used with horizontal and vertical recording modes. For each of these modes, the table shows the write current and relative head/medium position for writing an isolated transition, the write field profile with the portion effecting the transition accentuated, the response of the magnetization at time t=t0, and the remanent magnetization after the head has passed.

Of the techniques shown in FIG. 7, NRZ horizontal and NRZ vertical are the conventional methods, and the RZ vertical method is the method of the present invention The RZ horizontal method is not viable since there exists no demagnetizing effect to quench the remanent magnetization away from the transition.

For the RZ vertical recording method, it can be seen that a transition is produced which not only is symmetrical but also is sharper. The transition is sharper because the write field gradients below the gap are substantially larger than that gradient below the heads' trailing edge which is used with NRZ recording.

It has been shown that a short pulse of write current in the vertical recording mode produces advantageous operation when considering isolated data bits. Since the vertical magnetization vanishes between data bits in the RZ vertical recording method, some options are available for data encoding. Since it is desired to select an encoding option which produces the greatest recording density, these options will be considered.

Figure 8:
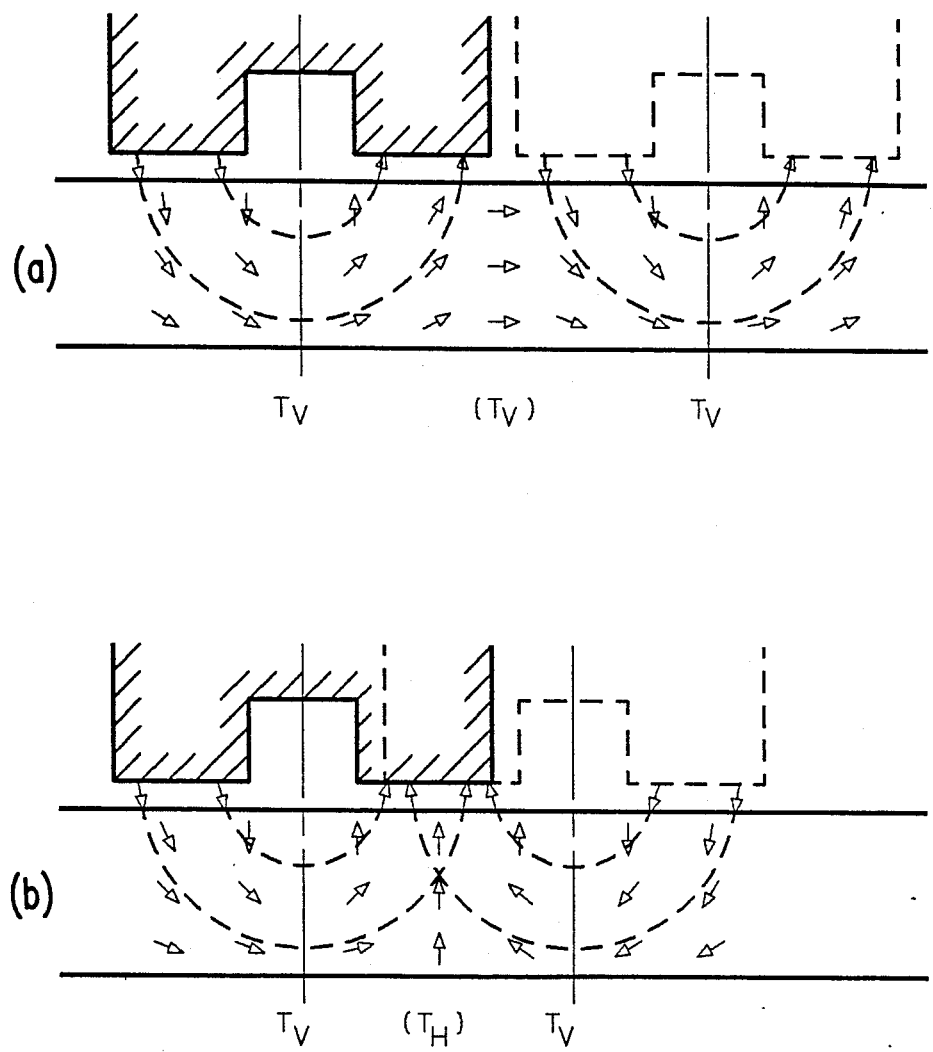
FIG. 8 is a sketch showing the magnetization configuration about two adjacent transitions written with (a) write pulses of single polarity and (b) write pulses of alternating polarity.
Figure 9:
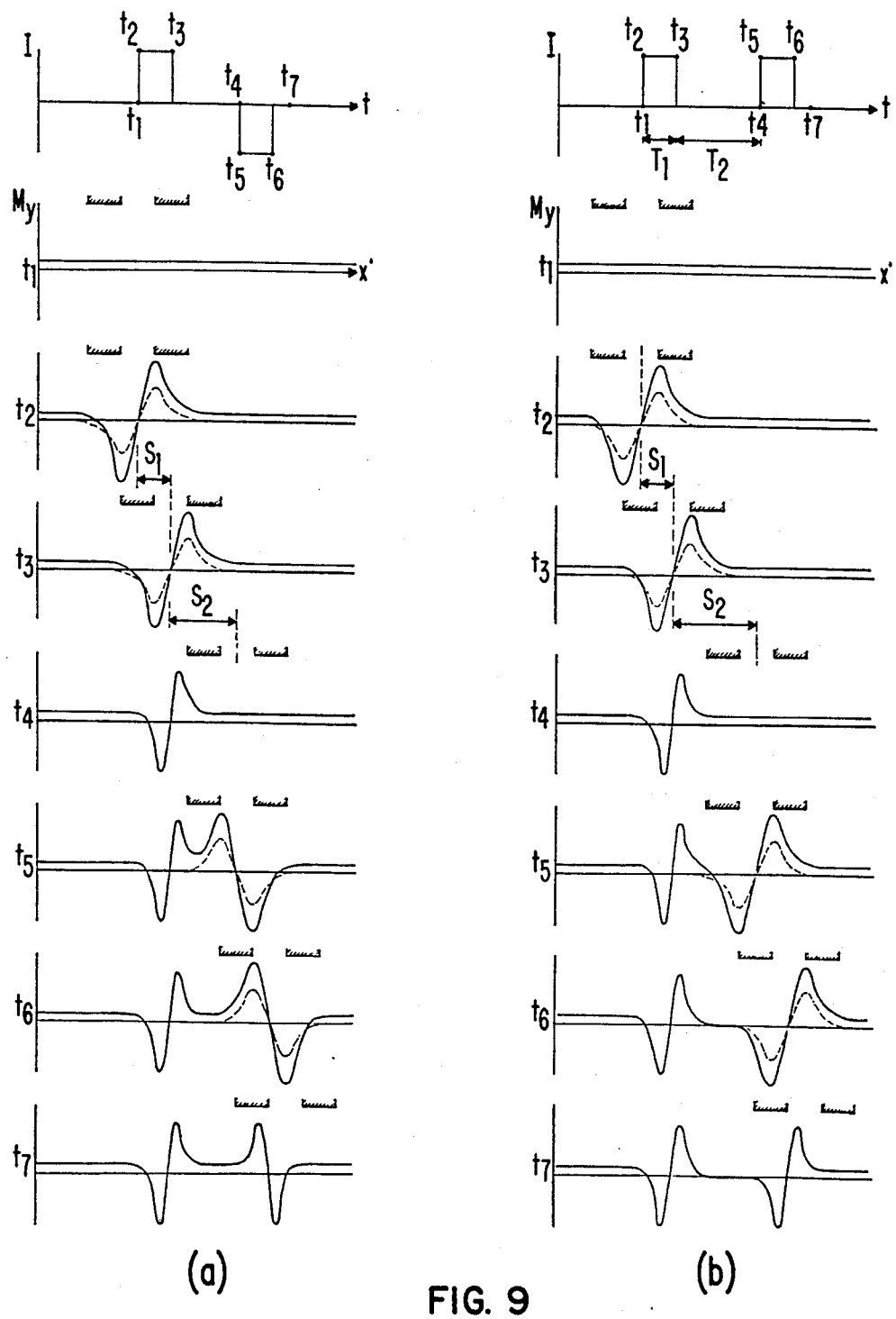
FIG. 9 consisting of 9A and 9B is a sketch showing a sequence of RZ recording events in the alternating and single polarity mode.

There are three options for data encoding. A first option is with single polarity write pulses, in which data is encoded by the presence or absence of a pulse. A second option is with alternating polarity write pulses, in which data is encoded by having a positive or negative pulse. A third option allows for data encoding using ternary, bipolar write pulses, in which data is encoded by having no pulse, a positive pulse, or a negative pulse. The first two of these options are examined with the aid of FIG. 8, which analyzes a write sequence consisting of two pulses of alternating polarity (a) and alternatively, two single polarity (b) pulses. Pulse width is T1. The spacing between pulses is T2. Time instances of interest labelled t1 through t7. For each of these instances, the figure shows the corresponding head position, the write field profile (dashed curve), and the response of the magnetization. It is assumed that the medium has previously been DC erased, leaving the small uniform remanent magnetization evident in the "t1". In the encoding method shown in FIG. 9, information is defined by the presence (1) or absence (0) of a pulse, but other encoding methods could be used. At t2, the first write pulse is applied, producing the depicted transition. While the pulse is one, this transition remains stationary relative to the write field, propagating along the medium at the velocity, v. At t3, which marks the trailing edge of the pulse, the transition freezes in the medium, while, because of the demagnetizing fields, there occurs some slimming of the transition profile. The location of its formation has now moved a distance $s1 = v \times T1$, from the recording head.

The second write pulse occurs at t4. Between t3 and t4 the bit moved a distance, $s2 = v \times T2$, Let us find the minimum pulse spacing, T2, such that the write field of the second pulse does not affect the previously recorded bit. This minimum separation must depend on the spatial extent of the write field. For the sake of a simple argument, we assume that the effective write field extends just to the outer edge of the pole pieces and that the shoulders of a written magnetization profile have the same spatial extent. Then, at t5, the leading edge of the second write pulse, the head needs to be separated from the recorded bit at least by a distance: (single polarity) $s2 = (2p+g)$; (alternating polarity) $s2 = (p+g)$; where g and p are the of the gap and the pole pieces, respectively. This minimum separation defines $T2 = s2/v$, the min. spacing between write pulses. By t6, the second transition freezes in the medium. The final illustration, at t7, shows both transitions recorded and moving with the medium.

From above, the minimum separation between adjacent data bits is:

$$s = vT + (2p+g),$$

for the single polarity sequence, and $$s = vT + (1p+g),$$

for the alternating polarity sequence.

Figure 10:
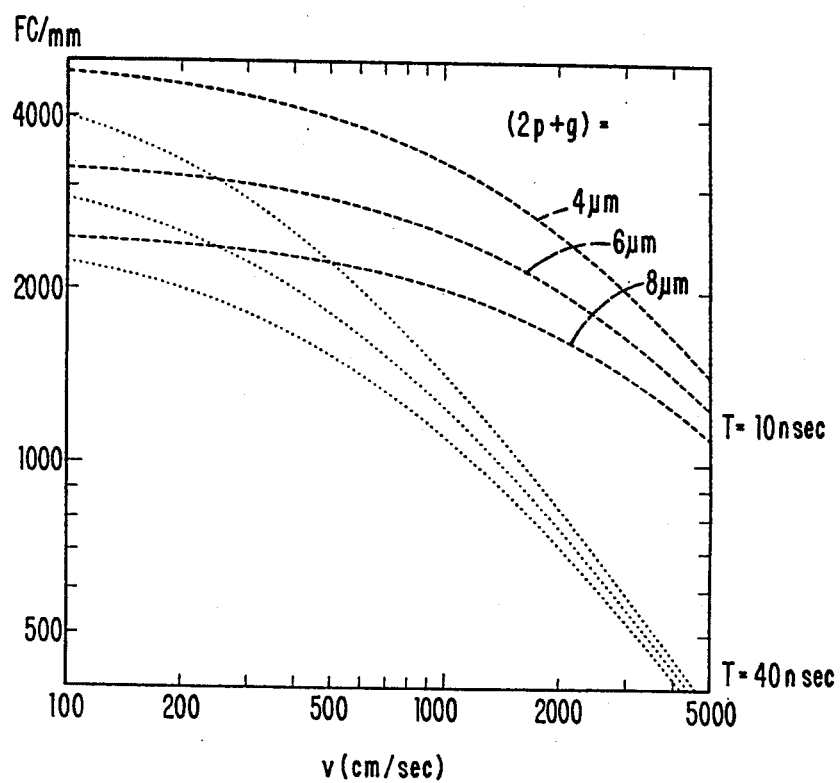
FIG. 10 is a graph showing recording densities in the RZ vertical recording alternating mode for different head geometries and length of write pulse (T).

In the RZ mode, the attainable recording density is limited by head geometry, medium velocity and duration of the write pulse, as shown in FIG. 10. This figure shows reciprocal bit spacing as a function of medium velocity for three different head geometries and three different pulse lengths. From FIG. 10 it can be seen that the attainable density is predominantly limited, at lower media velocities, by head geometry and, at higher media velocities, by the length of the write pulses.

In suitable systems, vertical recording in the RZ mode provides improvements in linear density as well as in the amplitude and waveform of the output signal. In terms of the write process, the RZ mode utilizes write field reductions which permit the use of much simplified write head configurations. With regard to the medium, the RZ method opens up a new approach to the design of recording media. Improvements in recording density do not have to rely on further increases of coercivity, but instead, are sought through a judicious choice of media characteristics While the invention has been particularly shown and described with reference to a preferred embodiment thereof, it will be understood by those skilled in the art that various other changes in the form and details may be made therein without departing from the spirit and scope of the invention.

Having thus described my invention, what I claims as new, and desire to secure by Letters Patent is:

1. A vertical magnetic recording method comprising the steps of:
    providing a magnetic recording medium having low vertical remanence;
    positioning a magnetic transducer having means for producing a bipolar magnetic field and a recording gap so that said recording gap is in close proximity to said magnetic recording medium;
    producing relative motion between said magnetic transducer and said magnetic recording medium; and
    energizing said means for producing a bipolar magnetic field with a unidirectional recording current impulse of short duration to write a bipolar recorded transition beneath said recording gap in said magnetic recording medium.

2. The vertical magnetic recording method according to claim 1 wherein said energizing step comprises energizing said means for producing a magnetic field with successive ones of said unidirectional current impulses produced in a mode in which impulses have the same polarity.

3. The vertical magnetic recording method according to claim 1 wherein said energizing step comprises energizing said means for producing a bipolar magnetic field with successive ones of said unidirectional current impulses produced in a mode in which said impulses alternate in polarity between a positive impulse and a negtaive impulse.

4. The vertical magnetic recording method according to claim 1 wherein said positioning step comprises positioning said magnetic transducer so that said recording gap is substantially in contact with said recording medium.

5. The vertical magnetic recording method according to claim 1 wherein said unidirectional current impulse has a duration which is short relative to the spacing between adjacent recorded transitions divided by said relative velocity between said magnetic transducer and said magnetic recording medium.

6. The vertical magnetic recording method according to claim 1 wherein said unidirectional current impulse has a duration not substantially greater than the length of the pole pieces forming said recording gap divided by the velocity of said relative motion of said magnetic recording medium.

7. The vertical magnetic recording method according to claim 1 wherein said magnetic recording medium has a vertical remanence of less than 20 percent.

8. A vertical magnetic recording system for recording magnetic field signals representing information on an associated recording medium, said system comprising a selectively magnetizable recording medium, at least one recording head, means for producing relative motion between the recording medium and the recording head, and means for supplying signals representing information to the recording head for recording upon the medium, the improvement comprising:
    said recording medium having a recording layer of magnetic material thereon, said recording layer of magnetic material having low vertical remanence; and
    said means for supplying signals representing information supplying one unidirectional current impulse of short duration to said recording head for each unit of information to be recorded upon said recording medium wherein the direction of the magnetic recording field applied to said recording layer of said recording medium is substantially perpendicular to the surface of said recording medium such that the magnetic flux passes transversely through said recording layer whereby the magnetic recording is produced in the vertical recording mode.

9. The vertical magnetic recording system according to claim 8 wherein successive ones of said unidirectional current impulses are produced in a mode in which impulses have the same polarity.

10. The vertical magnetic recording system according to claim 8 wherein successive ones of said unidirectional current impulses are produced in a mode in which impulses alternate in polarity between a positive impulses and a negative impulses.

11. The vertical magnetic recording system according to claim 8 wherein the recording head is positioned substantially in contact with the recording medium.

12. The vertical magnetic recording system according to claim 8 wherein said unidirectional current impulse has a duration which is short relative to the spacing between adjacent recorded transitions divided by said relative velocity between said recording head and said magnetic recording medium.

13. The vertical magnetic recording system according to claim 8 wherein said unidirectional current impulse has a duration not substantially greater than the length of the pole pieces of said recording head divided by the velocity of said relative motion between said recording medium and said recording head.

14. The vertical magnetic recording system according to claim 8 wherein said recording layer of magnetic material has a vertical remanence of less than 20 percent.

15. The vertical magnetic recording system according to claim 8 wherein said recording head produces a bipolar magnetic field.

* * * * *